US011722471B1

(12) United States Patent
Ramanujan

(10) Patent No.: US 11,722,471 B1
(45) Date of Patent: *Aug. 8, 2023

(54) SYSTEMS AND METHODS FOR SECURE DATA TRANSPORT

(71) Applicant: Architecture Technology Corporation, Eden Prairie, MN (US)

(72) Inventor: Ranga S. Ramanujan, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 707 days.

This patent is subject to a terminal disclaimer.

(21) Appl. No.: 16/860,208

(22) Filed: Apr. 28, 2020

Related U.S. Application Data

(63) Continuation of application No. 15/975,610, filed on May 9, 2018, now Pat. No. 10,652,220.

(51) Int. Cl.
*H04L 9/40* (2022.01)
*H04L 47/2483* (2022.01)
*H04L 69/04* (2022.01)
*H04L 69/22* (2022.01)

(52) U.S. Cl.
CPC ........ *H04L 63/0485* (2013.01); *H04L 47/2483* (2013.01); *H04L 63/0272* (2013.01); *H04L 63/029* (2013.01); *H04L 69/04* (2013.01); *H04L 69/22* (2013.01)

(58) Field of Classification Search
CPC ............. H04L 63/0485; H04L 47/2483; H04L 63/0272; H04L 63/029; H04L 69/04; H04L 69/22
USPC ........................................................ 380/269
See application file for complete search history.

(56) References Cited

U.S. PATENT DOCUMENTS

| | | | |
|---|---|---|---|
| 6,618,397 B1 | 9/2003 | Huang | |
| 7,215,667 B1 | 5/2007 | Davis | |
| 7,768,913 B1 | 8/2010 | Shepherd et al. | |
| 8,745,185 B1 | 6/2014 | Salo | |
| 9,100,457 B2 | 8/2015 | Hsu | |
| 10,979,402 B1 | 4/2021 | Hartley et al. | |
| 2005/0198367 A1 | 9/2005 | Ettikan et al. | |
| 2010/0189103 A1 | 7/2010 | Bachmann et al. | |
| 2010/0260098 A1 | 10/2010 | Ulupinar et al. | |
| 2011/0016313 A1 | 1/2011 | Jin et al. | |

(Continued)

OTHER PUBLICATIONS

Architecture Technology Corporation, Final Report, Topic Number: N162-073, M67854-17-P-6513, Jun. 18, 2017, 35 pages.

(Continued)

*Primary Examiner* — Christopher C Harris
(74) *Attorney, Agent, or Firm* — Foley & Lardner LLP

(57) ABSTRACT

Disclosed herein are embodiments of systems, methods, and products comprise a computing device, which provides a secure data transport service (SecureX) for data packets traversing from an end user device (EUD) to a mission network over untrusted networks. The disclosed SecureX module may be software product running on the EUD and on a SecureX appliance fronting the mission network. The SecureX module on the EUD compresses the data packets by removing header fields that are constant over the same packet flow and double encrypts the data packets with different cryptographic keys. The SecureX on the EUD transmits the double compressed encrypted data packets over the untrusted network. The SecureX appliance receives the double compressed encrypted data packets, decrypts the data packets and decompresses the data packets to recreate the original data packets. The SecureX appliance transmits the original data packets to the mission network.

20 Claims, 10 Drawing Sheets

(56) References Cited

U.S. PATENT DOCUMENTS

| | | |
|---|---|---|
| 2011/0122893 A1 | 5/2011 | Kang et al. |
| 2012/0144191 A1 | 6/2012 | Lebovitz et al. |
| 2015/0110131 A1 | 4/2015 | Roskind |
| 2016/0081079 A1 | 3/2016 | Kneckt et al. |
| 2016/0292446 A1 | 10/2016 | Lawrence et al. |
| 2017/0055178 A1 | 2/2017 | Seshadri et al. |
| 2017/0264716 A1 | 9/2017 | Bertz et al. |
| 2017/0359718 A1 | 12/2017 | Denny |
| 2019/0207747 A1 | 7/2019 | Durvasula et al. |
| 2019/0320014 A1 | 10/2019 | Allen et al. |

OTHER PUBLICATIONS

Architecture Technology Corporation, Proposal Number: F172-009-0185, Topic Number: AF172-009, 1, Identification and Significance of the Problem or Opportunity, Jun. 21, 2017, 11 pages.

Non-Final Office Action on U.S. Appl. No. 15/975,580 dated Aug. 20, 2020.

|  | Initial Packet | ESP – Tunnel in Tunnel | SecureX Encrypted 1st packet | SecureX Encrypted Compressed |
|---|---|---|---|---|
| IP Header | 20 | 20 | 20 | 20 |
| TCP Header/UDP | 20/8 |  | 8 | 4 |
| ESP Header |  | 8 | 0 | 0 |
| ESP Trailer |  | 2 |  |  |
| Inner Encryption |  |  |  |  |
| • IP |  | 20 | 10 |  |
| • TCP/UDP |  | 20/8 | 15/4 | 6-11/0 |
| • IV |  | 8 | 8 | 8 |
| • ICV |  | 12-16 | 8 | 8 |
| • Padding |  | 0-3 | 0 |  |
| Outer Encryption |  |  |  |  |
| • Outer IP |  | 20 | 0 | 0 |
| • Outer IPSec |  | 8 | 0 | 0 |
| • Outer IPSec Trailer |  | 2 |  |  |
| • IV |  | 8 | 0 | 0 |
| • ICV |  | 12-16 | 8 | 8 |
| • Padding |  | 0-3 |  |  |
| Total UDP | 28 | 128-142 | 66 | 48 |
| Total TCP | 40 | 140-154 | 77 | 54-59 |

*FIG. 10*

SYSTEMS AND METHODS FOR SECURE DATA TRANSPORT

CROSS-REFERENCE TO RELATED APPLICATIONS

This application is a continuation application of U.S. Application No. 15/975,610, entitled "Systems and Methods for Secure Data Transport," filed May 9, 2018, which is hereby incorporated in its entirety herein.

TECHNICAL FIELD

This application relates generally to methods and systems for secure data transport.

BACKGROUND

Some applications may need to take advantage of the new non-geostationary orbit (NGSO) satellite constellations deployed by commercial vendors, such as Iridium® and O3b®, for data transportation. These next-generation commercial satellite communications (SATCOM) services may provide pole-to-pole Internet protocol (IP) based broadband connectivity to mobile users, such as department of defense (DoD) subscribers, including manned and unmanned aerial platforms, maritime assets, ground mobile units and dismounted warfighters. For instance, Iridium Certus®, the broadband IP service built upon the NGSO Iridium® Next constellation, may provide DoD users with high-speed data services up to 1.4 Mbps. For this service, which is slated to be operational worldwide in a couple of years, data traffic between mobile DoD users (or platforms) are routed among 66 cross-linked low-Earth orbit satellites, through a dedicated gateway and controlled infrastructure owned and operated by the DoD.

With the availability of ubiquitous broadband services, such as Certus®, it may become possible for the DoD to provide mobile users with worldwide access to mission-oriented cloud services, such as surveillance, intelligence, reconnaissance information system (SIRIS). The SIRIS may fuse intelligence, surveillance and reconnaissance (ISR) information obtained from a variety of unmanned aerial vehicle (UAV) platforms as well as other sources and make mission-tailored information products including imagery and video available through a continental United States (CONUS) based web site to remote users equipped with a web browser. A commercial satellite broadband service such as Certus® may offer the promise of ubiquitous broadband reach back to such mission cloud services for remote DoD users. In addition, the commercial satellite broadband service may enable manned and unmanned aerial platforms which produce high-volume ISR streams to transfer the data to CONUS based cloud servers or processing, exploitation, and dissemination (PED) systems. However, the commercial satellite services may lack a key capability needed by the missions, e.g., protection of classified mission data in transit. Depending on the kind of mission information exchanged between the communicating elements, the IP data traffic over the commercial satellite service may need to be protected up to the Top Secret level.

The existing and conventional method for implementing classified network applications over the broadband commercial satellite services may suffer from two major limitations. First, the existing method for interconnecting platform local area network (LAN) enclaves over the SATCOM wide area network (WAN) may use high assurance Internet protocol encryption (HAIPE) based inline network encryptors (INEs) with two IP routers straddling each INE. There may be three major drawbacks for the method: (1) the method may employ three boxes with concomitant CSWaP implications especially for constrained UAV environments; (2) the method may use three layers of IP packet encapsulation producing high network overhead; specifically, each 1000 byte TCP payload incurs 94 bytes of overhead or 9.4%; and (3) the INEs for encrypting up to Top Secret may be controlled cryptographic items (CCIs) which cannot be used in unmanned environments such as UAVs.

Second, HAIPEs may not be suitable for mobile users with handheld devices such as tablets and smartphones who may need to access classified information over broadband satellite services. Although miniaturized HAIPEs such as the L-3 Talon 3 are emerging, this may still require the mobile user to carry another piece of equipment. In addition, the equipment is not self-powered and must draw power from the handheld end user device (EUD) which may deplete the EUD battery. Furthermore, the HAIPE may come with special CCI handling requirements making it cumbersome to use.

SUMMARY

What is therefore desired is a data transport method that ensures secure data transport for classified applications operating over broadband commercial satellite communications services. What is further required is a data transport method that has low network overhead and low power requirements.

Embodiments disclosed herein describe a secure data transport service (SecureX) to solve the aforementioned problems and other technological problems. In particular, the embodiments disclosed herein provide the secure data transport by performing two layers of Internet protocol security (IPSEC) based packet encryption compliant with the commercial solutions for classified multi-site connectivity capability package (MSC CP) and the mobile access capability package (MA CP). In addition, the embodiments disclosed herein reduce the network overhead by compressing and removing header fields of data packets that are constant over the same packet flow.

In one embodiment, a computer implemented method comprises compressing, by a first computer, a data packet by removing a portion of the header of the data packet to generate an inner layer compressed data packet; encrypting, by the first computer, the inner layer compressed data packet with an inner layer cryptographic key to generate an inner layer compressed encrypted data packet; compressing, by the first computer, the inner layer compressed encrypted data packet by removing a portion of the header of the inner layer compressed encrypted data packet to generate an outer layer compressed data packet; encrypting, by the first computer, the outer layer compressed data packet with an outer layer cryptographic key to generate an outer layer compressed encrypted data packet; transmitting, by the first computer, the outer layer compressed encrypted data packet to a secure network; receiving, by a second computer interfacing the secure network, the outer layer compressed encrypted data packet to a secure network; decrypting, by the second computer, the outer layer compressed encrypted data packet using the outer layer cryptographic key to derive the outer layer compressed data packet; decompressing, by the second computer, the outer layer compressed data packet by adding header information derived by the second computer from a previous outer layer encrypted data packet to derive the inner layer compressed encrypted data packet;

decrypting, by the second computer, the inner layer compressed encrypted data packet using the inner layer cryptographic key to derive the inner layer compressed data packet; decompressing, by the second computer, the inner layer compressed data packet by adding header information derived by the second computer from a previous data packet to derive the data packet; and transmitting, by the second computer, the data packet to the secure network.

In another embodiment, a system comprises a first set of computer instructions stored in a user device, which when executed by a first processor of the user device cause the first processor to: compress a data packet by removing a portion of the header of the data packet to generate an inner layer compressed data packet; encrypt the inner layer compressed data packet with an inner layer cryptographic key to generate an inner layer compressed encrypted data packet; compress the inner layer compressed encrypted data packet by removing a portion of the header of the inner layer compressed encrypted data packet to generate an outer layer compressed data packet; encrypt the outer layer compressed data packet with an outer layer cryptographic key to generate an outer layer compressed encrypted data packet; transmit the outer layer compressed encrypted data packet to a secure network; a computer interfacing the secure network and comprising a second processor configured to: receive the outer layer compressed encrypted data packet to the secure network; decrypt the outer layer compressed encrypted data packet using the outer layer cryptographic key to derive the outer layer compressed data packet; decompress the outer layer compressed data packet by adding header information derived by the second processor from a previous outer layer encrypted data packet to derive the inner layer compressed encrypted data packet; decrypt the inner layer compressed encrypted data packet using the inner layer cryptographic key to derive the inner layer compressed data packet; decompress the inner layer compressed data packet by adding header information derived by the second processor from a previous data packet to derive the data packet; and transmit the data packet to the secure network.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 10 illustrates encryption and compression overhead comparison, according to an exemplary embodiment.

DETAILED DESCRIPTION

Figure 1:
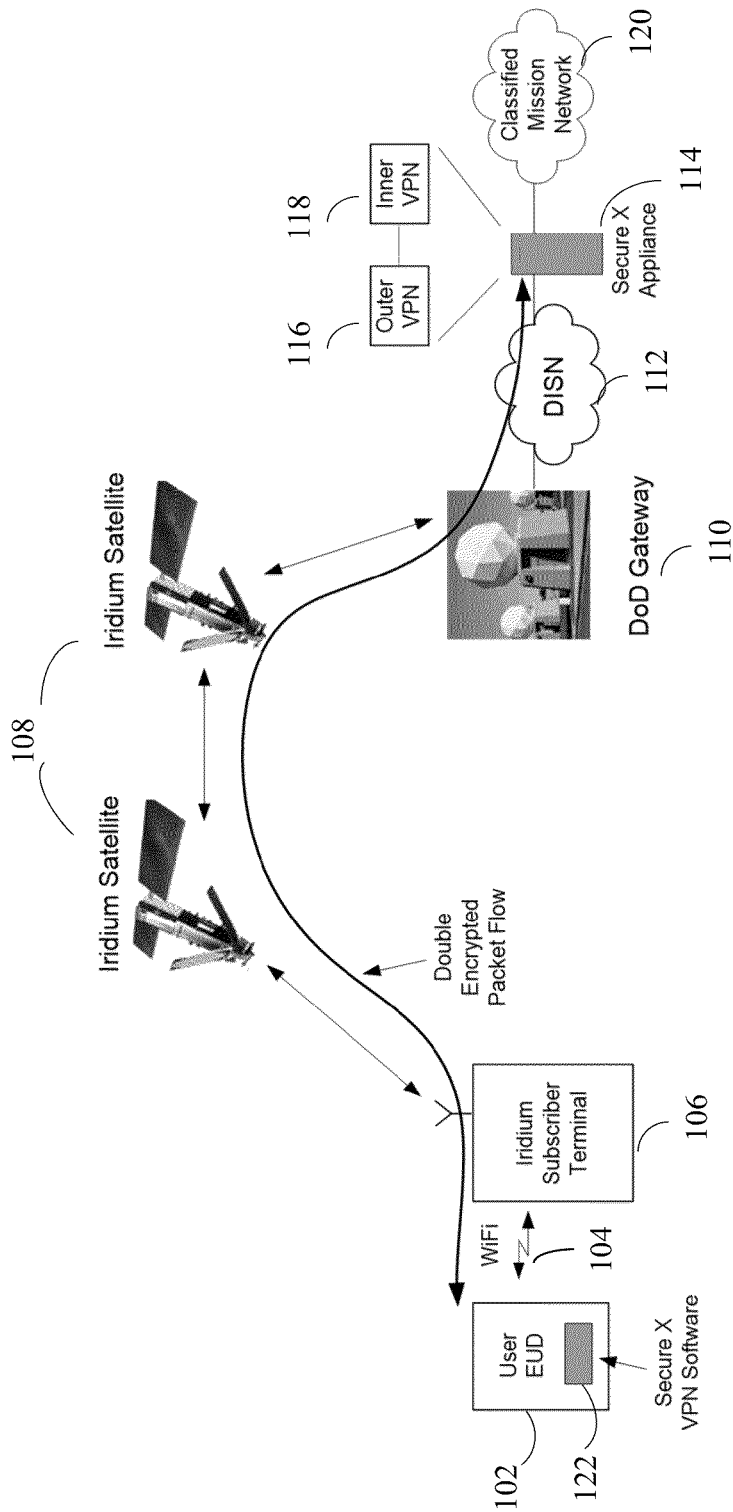
FIG. 1 illustrates a first system for secure data transport, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The SecureX module may provide a secure data transport service for classified applications operating over broadband commercial satellite services. An end user device may generate data packets and transmit the data packets to a mission network over untrusted networks (e.g., satellite network). The mission network may be an enterprise level secure network configured to handle secure and/or classified data. The SecureX module may be software product running on the end user device and a SecureX appliance fronting the mission network. To provide secure data transport, the SecureX module on the end user device may double encrypt the data packets with different cryptographic keys. Specifically, the SecureX module may include an inner layer VPN and an outer layer VPN. The inner layer VPN may encrypt the data packets with an inner layer cryptographic key. The outer layer VPN may encrypt the inner layer encrypted data with an outer layer cryptographic key. After the double encrypted data packets traverse the untrusted networks, the SecureX appliance fronting the mission network may receive the double encrypted data packets. The outer layer VPN of the SecureX appliance may decrypt the outer layer encryption, and the inner layer VPN of the SecureX appliance may decrypt the inner layer encryption to derive the original plaintext data packets. The mission network may receive the original data packets from the SecureX appliance.

In addition, the SecureX module may compress the data packets by removing a portion of the headers of the data packets. The headers (e.g., IP header, TCP header, UDP header) may include redundant information for data packets in the same packet flow, such as IP version, source IP address, destination IP address, time-to-live, and the like in IP header. To reduce such redundant information and reduce network overhead, the SecureX module may establish a flow identifier (ID) by assigning a flow ID for data packets of a new packet flow. The SecureX module may transmit the first data packet in a new packet flow (e.g., UDP or TCP flow) with uncompressed headers providing initial values for all IP and UDP or TCP headers' fields and compress the subsequent data packets in the packet flow by removing the constant header fields.

The SecureX module in the receiving computing device (e.g., SecureX appliance) may employ a flow tracking state machine to record the initial header field values and recreate header fields not transmitted for the subsequent in the packet flow. As a result, the receiving computing device may recreate the valid, routable data packets identical to the original data packets before compression.

FIG. 1 illustrates components of a first exemplary system 100 for secure data transport (SecureX) over the broadband commercial satellite services. Although the SecureX is agnostic to the broadband service over which it operates, the exemplary system 100 assumes Iridium Certus® as the broadband service. In addition, the exemplary system 100 assumes the availability of manpack and aircraft-integrated Iridium broadband terminals providing up to 1.4 Mbps of data throughput.

In FIG. 1, a user (e.g., a mobile warfighter) equipped with a handheld end user device (EUD) 102, e.g., a tablet or smartphone, may connect to the Certus® broadband service through a WiFi link 104 between the EUD 102 and the manpack Iridium subscriber terminal 106. The Certus® broadband service 108 may connect the EUD 102 through the Iridium DoD gateway 110 and the defense information systems network (DISN) 112 to the classified mission network 120. In front of the classified mission network 120, there may be a SecureX appliance 114 containing two independently implemented commercial solutions for classified (CSfC)-qualified IPSEC virtual private network (VPN) servers or gateways, such as an outer VPN 116 and an inner VPN 118.

The EUD 102 may be loaded with SecureX VPN software products 122, which may provide two independently implemented IPSEC VPN client components, inner VPN client and outer VPN client (not shown), which together may provide a two-layered IPSEC VPN tunnel connecting the EUD 102 to the classified mission network 120. The inner VPN client (not shown) of the EUD 102 may implement the inner IPSEC tunnel terminating at the inner VPN gateway 118 of the mission network 120 while the outer VPN client (not shown) of the EUD 102 may implement an independent encapsulating tunnel between the EUD 102 and the outer VPN gateway 118 of the mission network 120. In accordance with the MA CP, the two VPN clients of the SecureX VPN software 122 may double encrypt all IP packets originated by applications on the EUD 102 before the packets hit the WiFi interface 104 connecting the EUD 102 to the Iridium broadband terminal 106. Thereafter, the double encrypted data packets may traverse over the satellite network 108 and through the DISN 112 to the SecureX appliance 114 fronting the mission network 120. The outer VPN gateway 116 of the appliance may decrypt the outer layer of the double encrypted packets before passing them on to the inner VPN gateway 118, which may decrypt the inner layer of the packet to retrieve the plain text packets forwarded to the applications in the mission network 120.

The SecureX appliance 114 may be a dual-processor box, which performs two layers of IPSEC based packet encryption/decryption compliant with the commercial solutions for classified multi-site connectivity capability package (MSC CP) and the mobile access capability package (MA CP). The SecureX mobile client software 102 may be a software product or module running on mobile handhelds, which performs two layers of client-side IPSEC encryption/decryption in accordance with MA CP. While the SecureX may use IPSEC for both the inner and outer layers of the VPN connecting the EUD to the mission network, the CSfC MA CP, which governs this implementation, may also allow for transport layer security (TLS) or secure real-time transport protocol (SRTP) to be used for the inner layer of encryption instead of IPSEC.

Taking together the SecureX appliance 114 and the SecureX mobile client software 102 may enable the military and industry to provide classified network access services for procuring and providing commercial satellite services to the DoD user community. The industry companies (e.g., SMC®) may serve as the unified service provider for military as well as commercial satellite services for the DoD user community. The SecureX products may enable SMC® to provide the DoD users with a much-needed secure data transport service.

SecureX may provide (1) two layers of advanced encryption standard (AES)-256 encryption may protect data up to Top Secret level without the use of cumbersome CCI Type 1 cryptos; and (2) SecureX may do all encryption in software in the EUD without the need for an external crypto device such as a HAIPE INE; and (3) SecureX may user any commercial off-the-shelf (COTS) EUD on the CSfC components list (e.g., Samsung® Galaxy, Microsoft® Surface, Apple® iPad) for classified applications without the need for customized EUDs for classified environments.

The SecureX approach may be agnostic to the network, and may work over a heterogeneous IP internetwork composed of various kinds of local area network (LAN) and wide area network (WAN) technologies.

Figure 2:
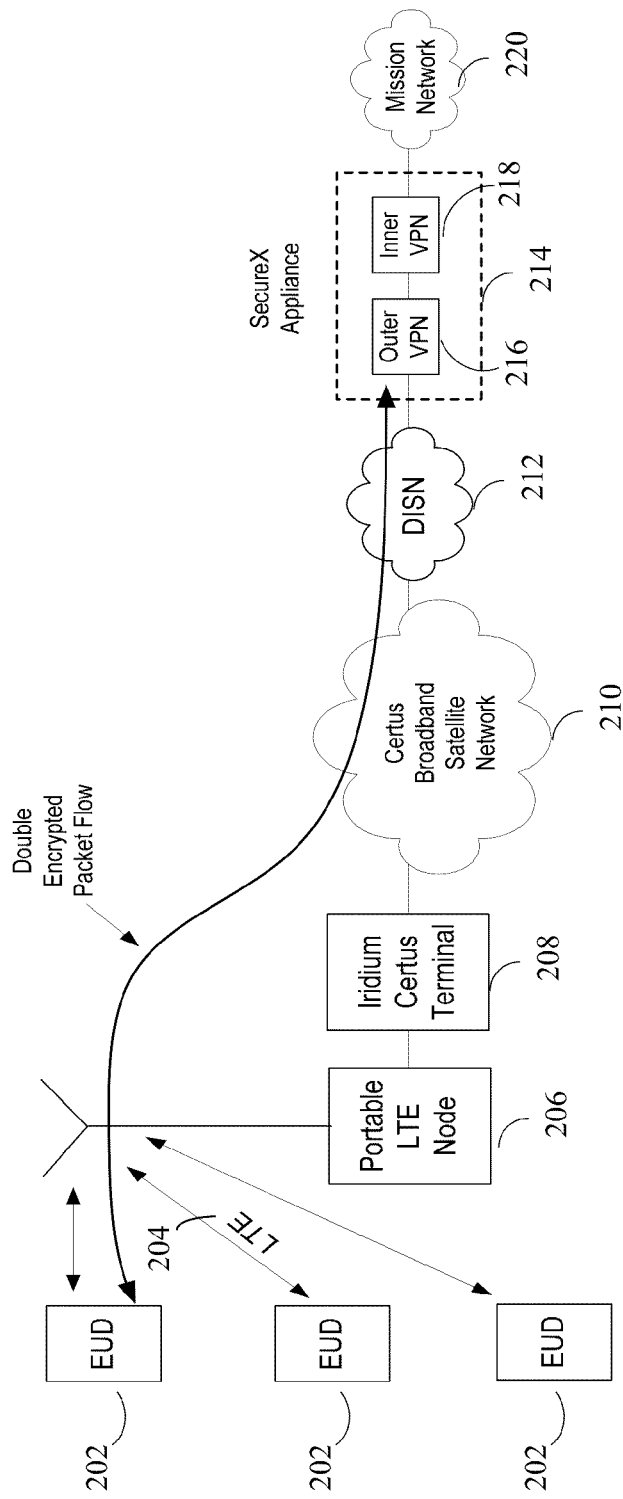
FIG. 2 illustrates a second system for secure data transport, according to an exemplary embodiment.

FIG. 2 illustrates components of a second exemplary system 200 for secure data transport (SecureX) over the broadband commercial satellite services. While the EUD in FIG. 1 uses built-in WiFi to connect the EUD to the Iridium broadband terminal, FIG. 2 shows a scenario where EUD uses the built-in LTE 204 for the connection. FIG. 2 depicts a set of users (e.g., expeditionary warfighters) equipped with EUDs 202 that may use a portable LTE node 206 (such as that from Tecore® networks) to rapidly establish a battlefield LTE access network which, through a Certus® backhaul, connects the EUDs 202 to the continental United States (CONUS) based classified mission network 220. The SecureX software (not shown) in the EUDs 202 may double encrypt the data packets originating at the EUDs, and transmit the encrypted data packets to the LTE network 204, which may forward the data packets over the Certus® broadband satellite network 210 to the remote mission network 220.

Specifically, the inner and outer VPN clients (not shown) of the EUDs 202 may double encrypt all IP packets originated by applications on the EUDs 202 before the packets hit the LTE interface 204. The portable LTE node 206 may connect the EUDs 202 to the Iridium Certus® terminal 208. Thereafter, the double encrypted data packets may traverse over the broadband satellite network 210 and through the DISN 212 to the SecureX appliance 214 fronting the mission network 220. The outer VPN gateway 216 of the SecureX appliance 214 may decrypt the outer layer of the double encrypted packets before passing them on to the inner VPN gateway 218, which may decrypt the inner layer of the packet to retrieve the plain text packets forwarded to the applications in the mission network 220.

Figure 3:
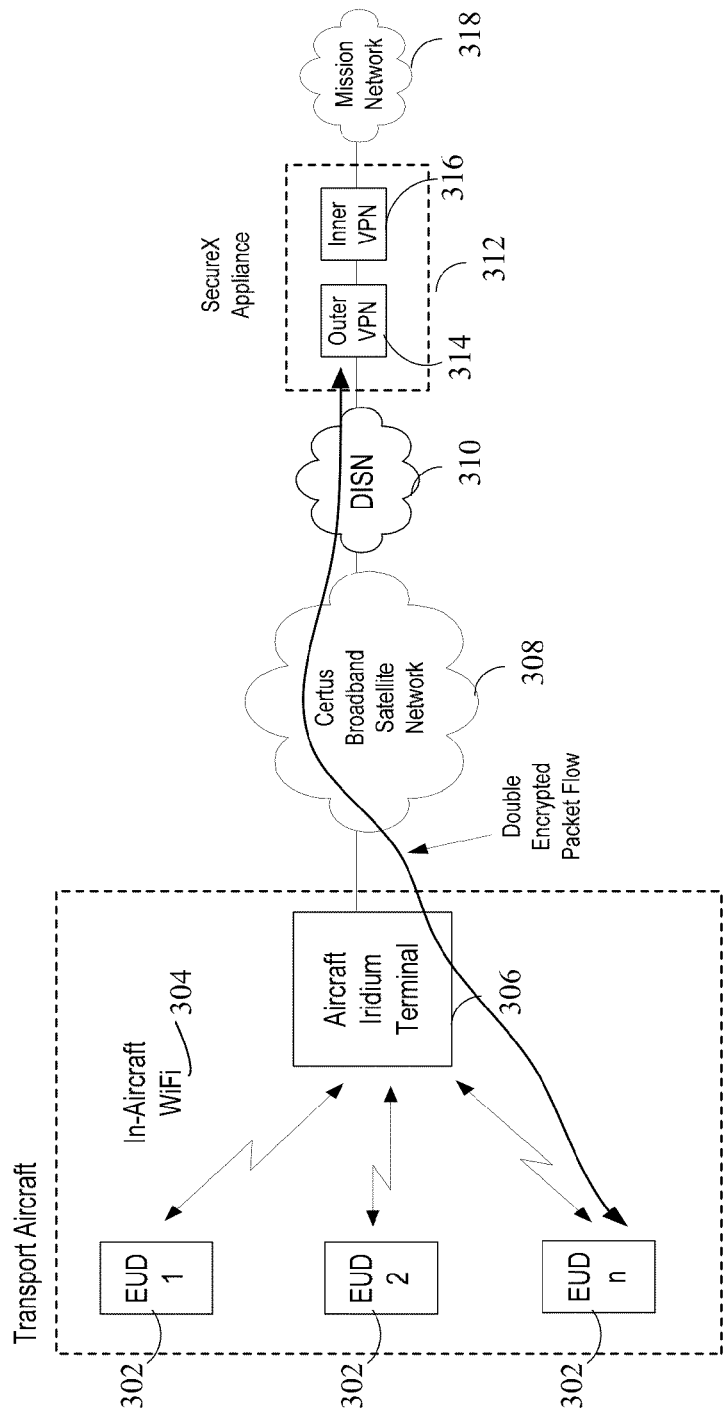
FIG. 3 illustrates a third system for secure data transport, according to an exemplary embodiment.

FIG. 3 illustrates components of a third exemplary system 300 for secure data transport (SecureX) over the broadband commercial satellite services. FIG. 3 shows a scenario where a group of users (e.g., warfighters) with EUDs 302 are en route to the mission objective in a wide body transport aircraft equipped with Iridium broadband terminals 306 as well as an in-cabin WiFi 304 for connecting users to the wide area network. The EUDs 302 may connect to the CONUS based mission network 318 through the Certus® broadband service 308 with the in-cabin WiFi 304 providing the on-ramp for the encrypted traffic originating from the EUDs. The inner and outer VPN clients (not shown) of the EUDs 302 may double encrypt all IP packets originated by applications on the EUDs 302 before the packets hit the LTE interface 204. The double encrypted data packets may traverse over the broadband satellite network 308 and through the DISN 310 to the SecureX appliance 312 fronting the mission network 318. The outer VPN gateway 314 of the appliance 312 may decrypt the outer layer of the double encrypted packets before passing them on to the inner VPN gateway 316, which may decrypt the inner layer of the packet to retrieve the plain text packets forwarded to the applications in the mission network 318.

Figure 4:
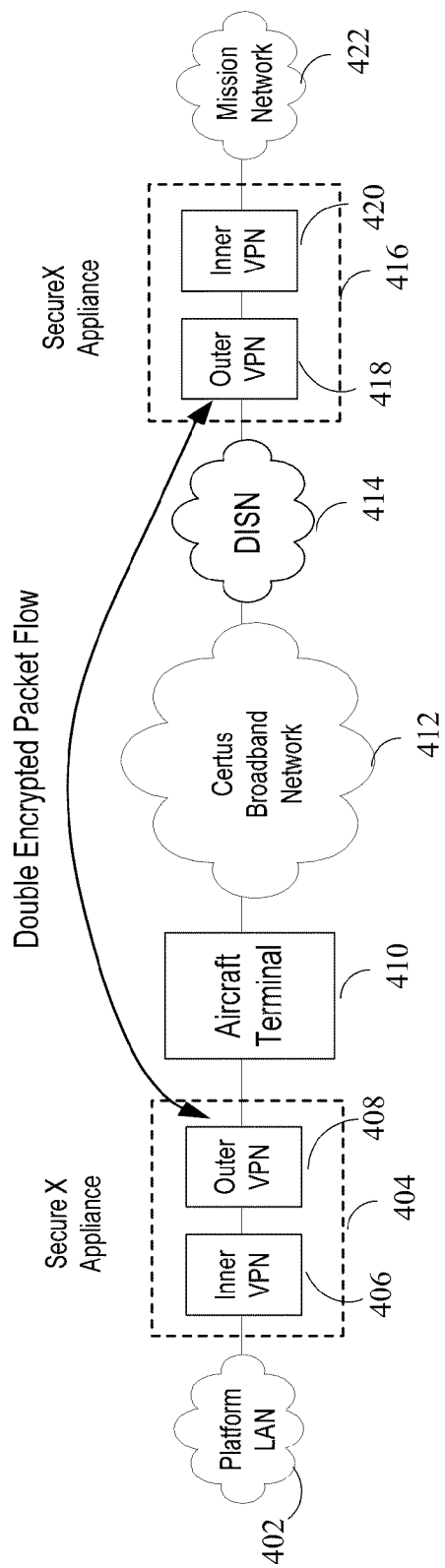
FIG. 4 illustrates a fourth system for secure data transport, according to an exemplary embodiment.

FIG. 4 illustrates components of a fourth exemplary system 400 for secure data transport (SecureX) over the broadband commercial satellite services. FIGS. 1 - 3 may focus on securely connecting a EUD to the classified mission network over an untrusted network. FIG. 4 shows a scenario where a platform 402 such as an unmanned aerial vehicle (UAV) uses SecureX to connect to the remote mission network 422 over the Certus® broadband satellite network 412. The SecureX may use a different CSfC capability, e.g., the multi-site connectivity capability package (MSC CP) to implement the layered encryption for data traffic.

A SecureX appliance 404 containing two independently implemented VPN gateways, e.g., inner VPN 406 and outer VPN 408, may connect to the classified LAN within the UAV 402. The two independent VPNs 406, 408 may perform two layers of IPSEC encryption on all traffic flowing between the UAV 402 and the classified mission network 422. The inner IPSEC tunnel may terminate at the inner VPN gateway 420 of the SecureX appliance 416 fronting the remote mission network and the outer IPSEC tunnel may terminate at the outer VPN gateway 418 of the SecureX appliance 416 fronting the mission network. In addition, the double encrypted packet flow may reach the mission network 422 by going through the aircraft terminal 410, the broadband satellite network 412, the DISN 414, and the SecureX appliance 416 fronting the mission network 422.

Figure 5:
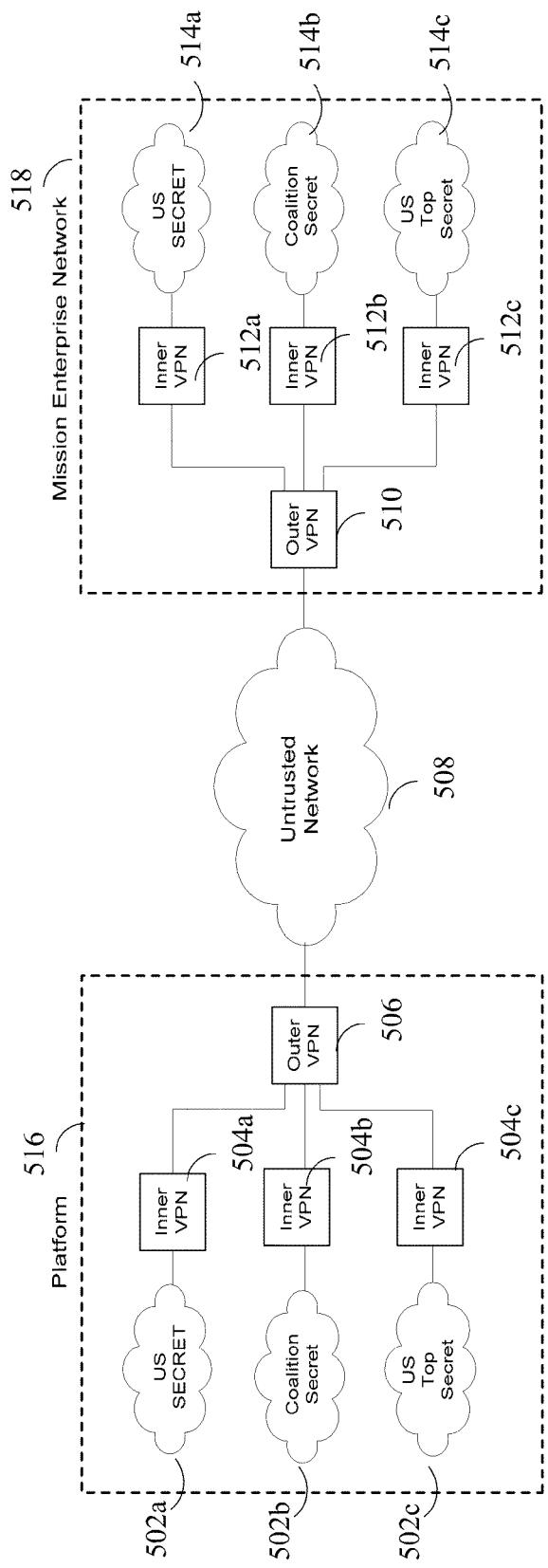
FIG. 5 illustrates a fifth system for secure data transport, according to an exemplary embodiment.

FIG. 5 illustrates components of a fifth exemplary system 500 for secure data transport (SecureX) over the broadband commercial satellite services. The MSC CP may allow inter site secure connectivity where the sites may have different enclaves at different security levels. FIG. 5 shows a scenario where a platform 516, such as a manned or unmanned aircraft, with three enclaves 502a-502c at different security classification levels connects to an enterprise network 518 with corresponding enclaves 514a-514c over an untrusted network 508. In the platform 516, each enclave 502a-502c may connect to a different inner VPN gateway 504a-504c but a single outer VPN 506 fronting the untrusted network. The inner VPN gateways 504a-504c may perform the inner layer encryption. The outer VPN 506 of the platform may perform the outer layer of encryption. Similarly, in the mission enterprise network 518, the outer VPN 510 may decrypt the outer layer of encryption, and each corresponding inner VPN 512a-512c may decrypt the inner layer of the encryption. Such an embodiment may provide a compact SecureX appliance for space constrained UAV environments.

Traditional MA CP and MSC CP based methods of using CSfC-qualified products on the national security agency's (NSA's) CSfC component list for connecting EUDs and platforms to the classified mission network may incur up to 15.4% per packet encryption overhead for a 1000 bytes TCP payload. This is a significant fraction of the 1.4 Mbps data connection provided by Certus®. SecureX may use a packet header compression technique implemented within the VPN gateway and VPN client components to reduce the overhead to less than 6%.

Figure 6:
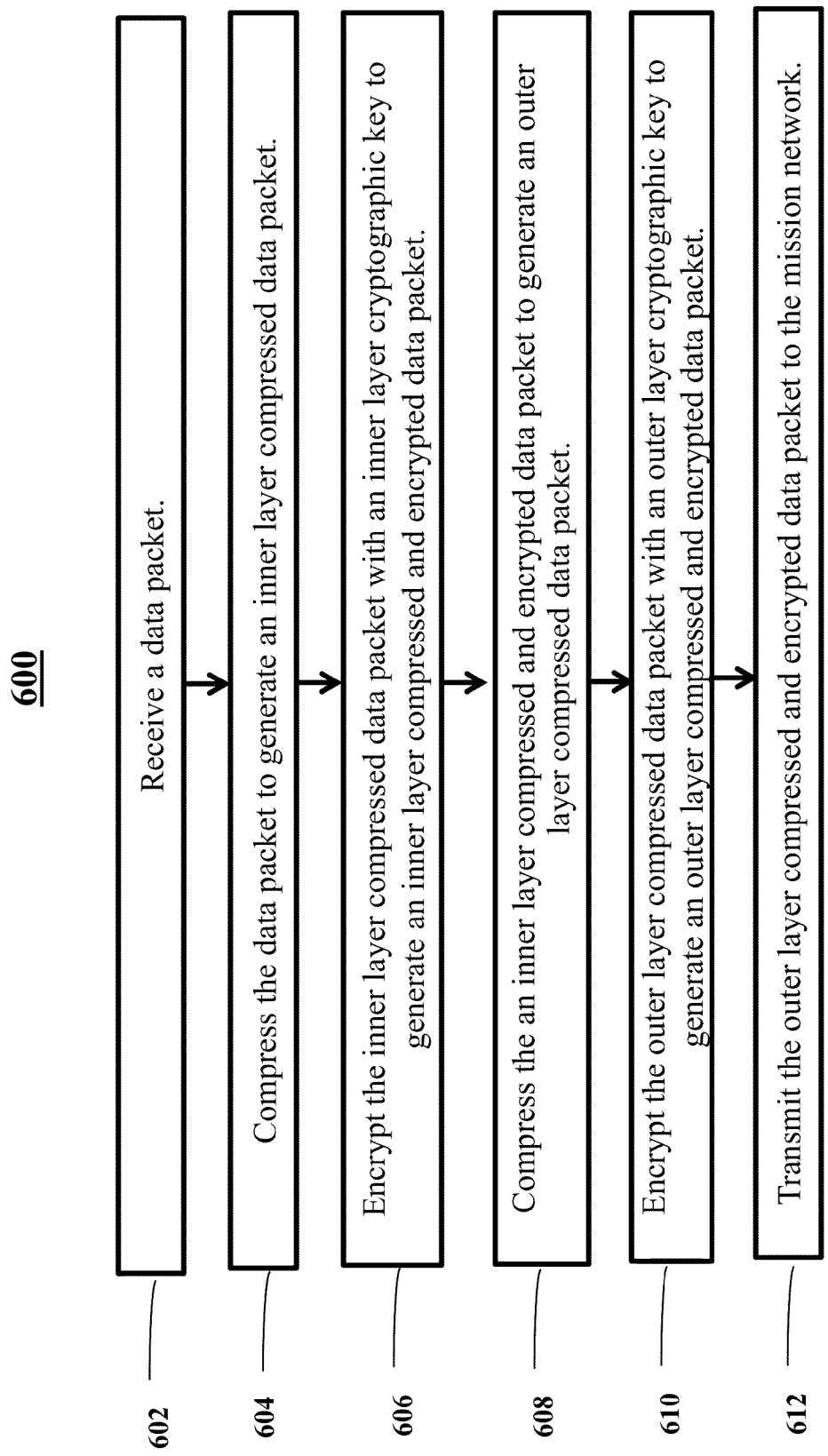
FIG. 6 illustrates a flowchart depicting operational steps for secure data transport by double encrypting and compressing the data packets, according to an exemplary embodiment.

FIG. 6 illustrates a flowchart 600 depicting operational steps for secure data transport by double encrypting and compressing the data packets, according to an exemplary embodiment. Other embodiments may comprise additional or alternative steps, or may omit some steps altogether.

At step 602, the SecureX module may receive a data packet generated by a user device (e.g., EUD). The SecureX module may be a client software module running on the EUD. The generated data packet may be a transmission control protocol (TCP) packet or a user datagram protocol (UDP) packet. The data packet may comprise IP header, TCP/UDP header, and payload data. The IP header may include information about IP version, source IP address, destination IP address, time-to-live (TTL), and the like. The TCP header may include information about source port number, destination port number, header length, window size, TCP checksum and the like. The UDP header may include information about source port number, destination port number, UDP length, and UDP checksum.

There may be a plurality of data packets within the same packet flow. The packet flow (traffic flow or flow) may be a sequence of data packets from a particular source computer to a particular destination computer. The packet flow may consist of all data packets in a specific transport connection or a media stream. The headers of different data packets within the same packet flow may share some common information. For example, the data packets of the same packet flow may have the same IP version, the same source IP address, the same destination IP address, the same time-to-live and the like in the IP headers. As a result, the IP heads of different data packets from the same packet flow may include some redundant information. The SecureX module may establish a flow identifier (ID) and eliminate the redundant information in the headers with the same flow ID. In operation, the SecureX module may assign a flow ID for data packets of a new packet flow. The SecureX module may pack the flow ID into the Identification and Fragment Offset fields of the IP headers in the first and subsequent data packets in a packet flow. Because the SecureX may pack the flow ID into existing, rarely used IP header fields, the flow ID may not contribute to the packet overhead.

At step 604, the SecureX module may compress the data packet to generate an inner layer compressed data packet. The SecureX module may use header compression or truncation to remove fields that are constant over the packet flow, such as IP addresses and UDP/TCP ports, as well as redundant fields like data length and checksums fields, which may be derived from IPSEC fields. In operation, the SecureX module may transmit the first data packet in a new packet flow (e.g., UDP or TCP flow) with uncompressed headers providing initial values for all IP and UDP or TCP headers' fields. The uncompressed headers of the first data packet may establish a packet flow and the values of header fields that may be constant through any ongoing communications associated with the packet flow. The SecureX module may compress the subsequent data packets in the packet flow by removing the constant header fields to generate inner layer compressed data packet.

The SecureX module in the receiving computing device may employ a flow tracking state machine, similar to flow tracking in a firewall, to record the initial header field values and recreate header fields not transmitted for the subsequent in the packet flow. As a result, the receiving computing device may recreate the valid, routable data packets identical to the original data packets before compression.

At step 606, the SecureX module may encrypt the inner layer compressed data packet with an inner layer cryptographic key to generate inner layer compressed and encrypted data packets. The SecureX module may use NSA approved public encryption algorithms, specifically, advanced encryption standard in Galois/Counter mode (AES-GCM), to encrypt the inner layer compressed data packets and secure data compliant with CSfC MA CP requirements. The SecureX module may generate a new inner layer IP header and an inner layer encapsulating security payload (ESP) header and an inner layer integrity check value (ICV) for each of the encrypted data packets. Such inner layer headers may include redundant information.

At step 608, the SecureX module may compress the inner layer compressed encrypted data packets to generate outer layer compressed data packets. The SecureX module may use the similar header compression or truncation techniques to remove the constant header fields of the inner layer headers. In operations, the SecureX module may transmit the first inner layer compressed encrypted data packet of the packet flow with uncompressed headers providing initial values for inner layer headers fields. The SecureX module may compress the subsequent inner layer compressed encrypted data packets by removing the constant inner layer header fields to generate outer layer compressed data packets.

At step 610, the SecureX module may encrypt the outer layer compressed data packets with an outer layer cryptographic key to generate outer layer compressed and encrypted data packets. The outer layer cryptographic key may be different from the inner layer cryptographic key. The SecureX module may generate a new outer layer IP header and an outer layer encapsulating security payload (ESP) header and an outer layer integrity check value (ICV) for each of the outer layer encrypted data packets.

At step 612, the SecureX module may transmit the outer layer compressed encrypted data packets to the mission network. The transmission may be over untrusted networks (e.g., over a commercial satellite broadband service).

Figure 7:
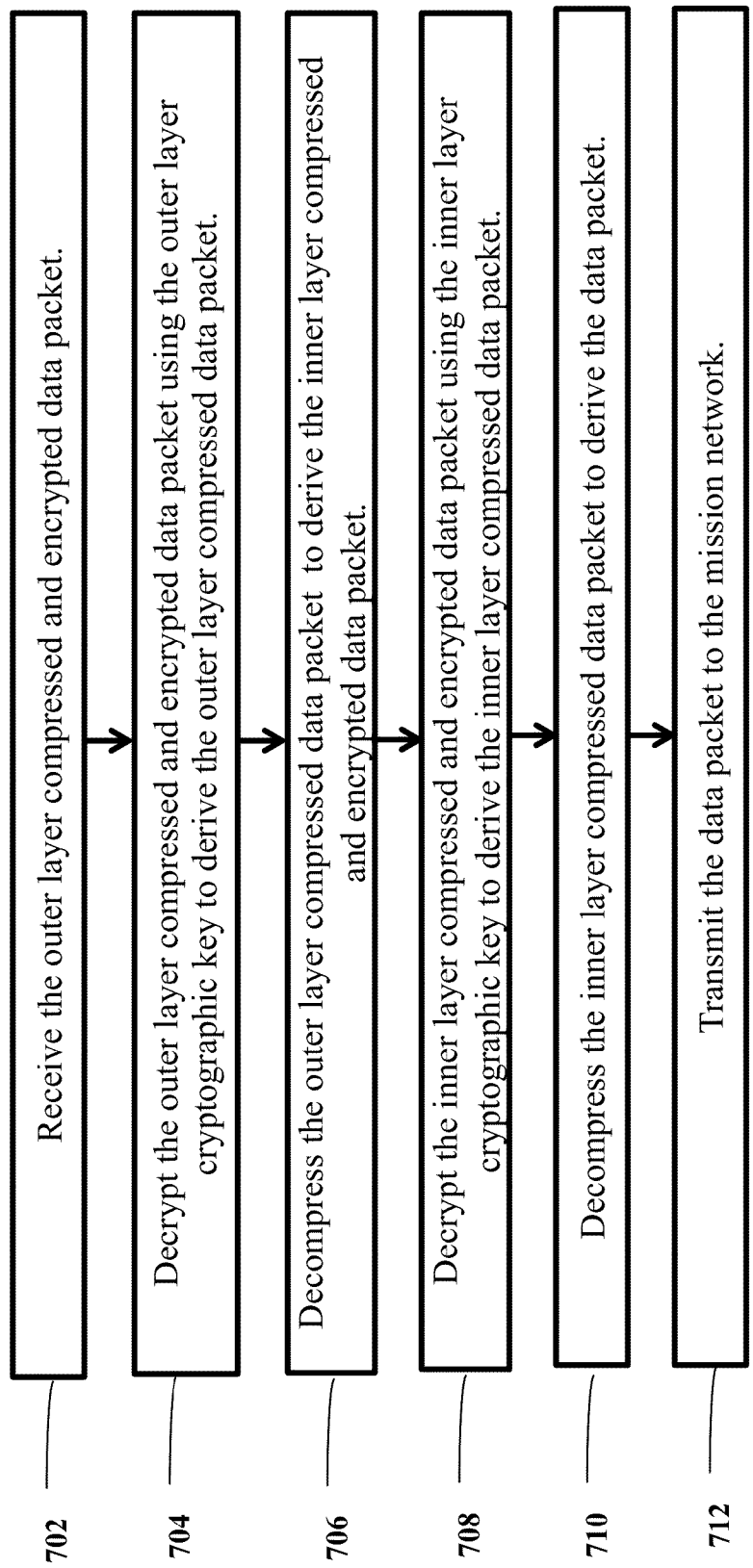
FIG. 7 illustrates a flowchart depicting operational steps for secure data transport by double decrypting and decompressing the data packets, according to an exemplary embodiment.

FIG. 7 illustrates a flowchart 700 depicting operational steps for secure data transport by double decrypting and decompressing the data packets, according to an exemplary embodiment. Other embodiments may comprise additional or alternative steps, or may omit some steps altogether.

At step 702, the SecureX module on the receiving computing device may receive the compressed encrypted data packets. The receiving device may be the SecureX appliance interfacing and/or fronting the mission network. As discussed above, The SecureX appliance may contain two independently implemented VPN gateways, e.g., Inner VPN and outer VPN. The two independent VPNs may perform two layers of decryption and decompression on all traffic flowing to the mission network.

At step 704, the SecureX module on the receiving computing device may decrypt the outer layer compressed encrypted data packets using the outer layer cryptographic key to derive the outer layer compressed data packets. The outer layer cryptographic key may be symmetric key. The receiving SecureX module may determine the outer layer cryptographic key based on the headers of the outer layer compressed encrypted data packets. For example, the receiving SecureX module may determine the security association between the sending and receiving parties based on the ESP header. The security association may be the establishment of shared security attributes between two network entities to support secure communication. The security association may include attributes such as cryptographic algorithm and mode; traffic encryption key; and parameters for the network data to be passed over the connection. Therefore, with the security association, the receiving SecureX module may be able to determine the cryptographic algorithm and the encryption key used by the sending SecureX module for outer layer encryption, and further decrypt the outer layer compressed encrypted data packets to derive the outer layer compressed data packets.

At step 706, the SecureX module on the receiving computing device may decompressed the outer layer compressed data packets to derive the inner layer compressed and encrypted data packets. As discussed above at step 608, the sending SecureX module may compress the second and subsequent inner layer compressed encrypted data packets to generate outer layer compressed data packets. However, the first inner layer compressed encrypted data packet may be uncompressed, which may provide the initial values for header fields. In other words, the receiving SecureX module may receive the first outer layer encrypted but not compressed data packets and subsequent outer layer compressed and encrypted data packets. After the outer layer decryption at step 704, the receiving SecureX module may derive a full, uncompressed first inner layer compressed encrypted data packer and subsequent outer layer compressed data packets.

Thus, to decompress the subsequent outer layer compressed data packets into the inner layer compressed encrypted data packets, the receiving SecureX may utilize the uncompressed first inner layer compressed encrypted data packet to recreate the header fields of the subsequent inner layer compressed encrypted data packets.

At step 708, the SecureX module on the receiving computing device may decrypt the inner layer compressed encrypted data packets using the inner layer cryptographic key to derive the inner layer compressed data packets. Based on the ESP header of the inner layer compressed encrypted data packets, the receiving SecureX module may determine the cryptographic algorithm ad encryption key used by the sending SecureX module for the inner layer encryption, and further decrypt the inner layer compressed encrypted data packets to derive the inner layer compressed data packets.

At step 710, the SecureX module on the receiving device may decompress the inner layer compressed data packets to derive the original data packets. As discussed above at step 604, the sending SecureX module may compress the second and subsequent original data packets to generate the inner layer compressed data packets. However, the first original data packets may be uncompressed, which may provide the initial values for header fields. After the inner layer decryption at step 708, the receiving SecureX module may derive an uncompressed first original data packet and subsequent inner layer compressed data packets. Thus, to decompress the subsequent inner layer compressed data packets into original data packets, the receiving SecureX module may utilize the uncompressed first original data packet to recreate the head fields of the subsequent original data packets.

At step 712, the SecureX module on the receiving computing device may transmit the original data packets to the mission network. The secure data transport services disclosed herein may ensure data security by transmitting doubled encrypted data packets over the untrusted networks and decrypting the data packets at the SecureX appliance fronting the mission network. As a result, the mission network may receive the original data packets while the untrusted networks may only receive double encrypted data packets. In addition, the secure data transport service disclosed herein may reduce the network overhead by compressing and removing the header fields that are constant over the same packet flow.

Figure 8:
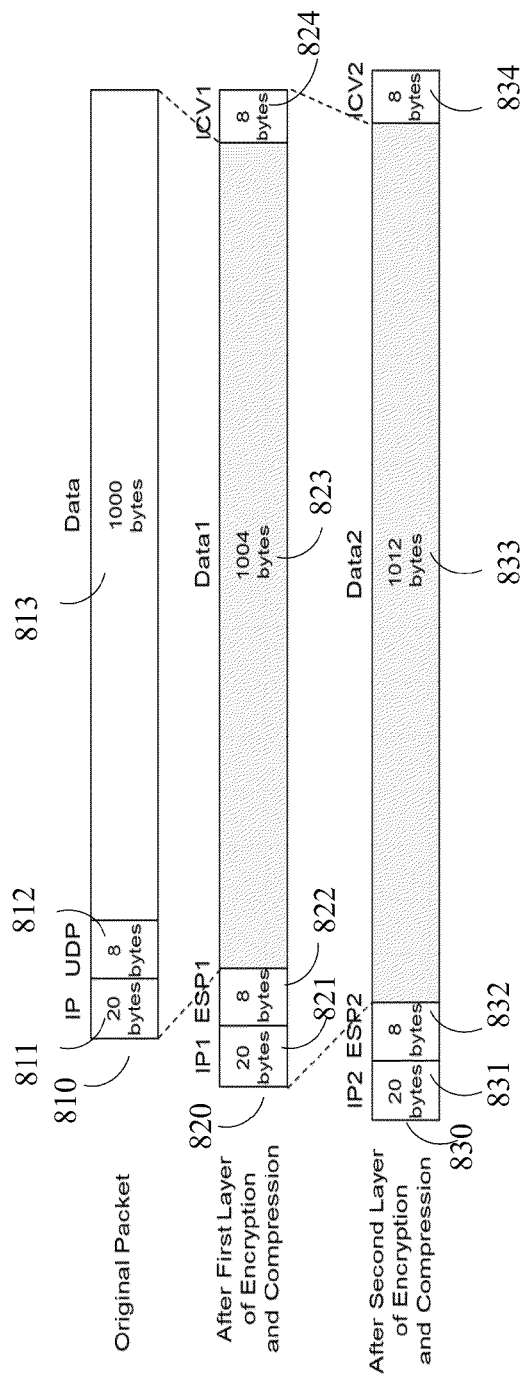
FIG. 8 illustrates an example of two layers of compression and encryption with user datagram protocol (UDP) packets, according to an exemplary embodiment.

FIG. 8 illustrates an example 800 of two layers of compression and encryption with user datagram protocol (UDP) packets, according to an exemplary embodiment. The original UDP data packet 810 may have 1000 bytes of user data 813. The original data packet may have a 20-byte IP header 811 and an 8-byte UDP header 812. Thus, the original data packet may be 1028 bytes.

During the first layer of compression (e.g., inner layer compression), the SecureX module may compress the 1028 bytes original data packet 810 into an inner layer compressed data packet of 1004 bytes 823. In addition, the SecureX module may encrypt the inner layer compressed data packet. In other words, the 1004 bytes data 823 may be in encrypted version. The SecureX module may add a new inner layer IP header 821, an inner layer ESP header 822, and an inner layer integrity check value (ICV) 824 to the encrypted data 823 to generate a first layer (e.g., inner layer) compressed encrypted data packet 820. The encrypted data 823 may be the payload of the first layer compressed encrypted data packet 820. The new inner layer IP header 821 may be 20 bytes, the inner layer ESP header 822 may be 8 bytes, and the ICV 824 may be 8 bytes. Thus, the first layer compressed encrypted data packet 820 may be 1040 bytes.

During the second layer of compression (e.g., outer layer compression), the SecureX module may compress the 1040 bytes first layer compressed and encrypted data packet 820 into an outer layer compressed data packet of 1012 bytes 833. In addition, the SecureX module may encrypt the outer layer compressed data packet. In other words, the 1012 bytes data 833 may be in encrypted version. The SecureX module may add a new outer layer IP header 831, an outer layer ESP header 832, and an outer layer integrity check value (ICV) 834 to the encrypted data 833 to generate a second layer (e.g., outer layer) compressed and encrypted data packet 830. The new outer layer IP header 831 may be 20 bytes, the outer layer ESP header 832 may be 8 bytes, and the ICV 834 may be 8 bytes. Thus, the second layer compressed encrypted data packet 830 may be 1048 bytes.

Figure 9:
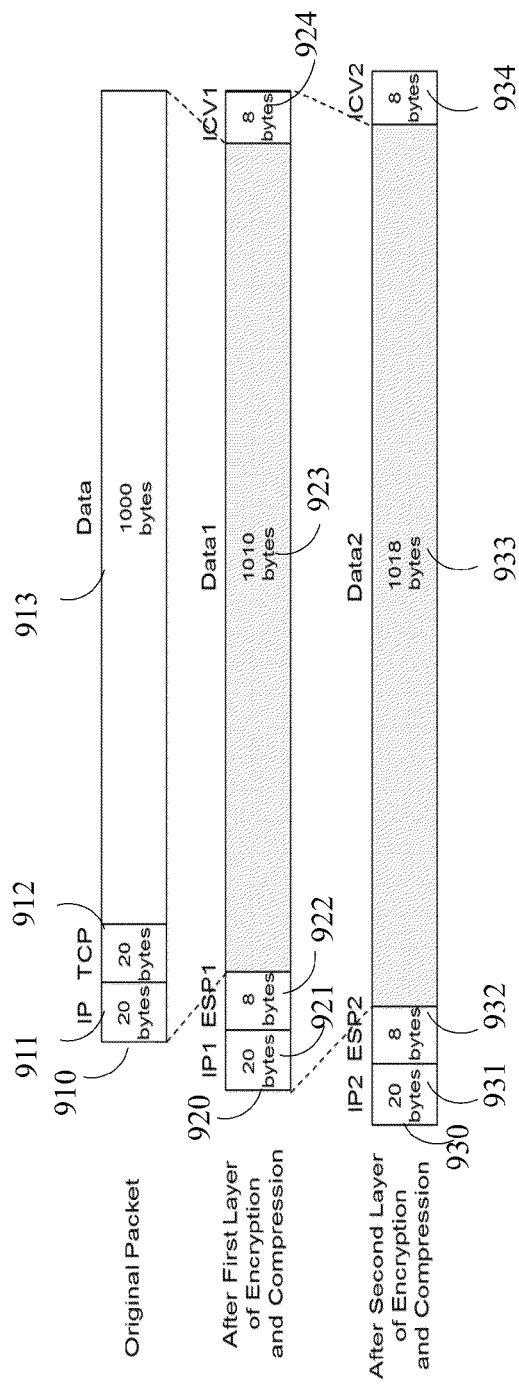
FIG. 9 illustrates an example of two layers of compression and encryption with transmission control protocol (TCP) packets, according to an exemplary embodiment.

FIG. 9 illustrates an example 900 of two layers of compression and encryption with transmission control protocol (TCP) packets, according to an exemplary embodiment. The original TCP data packet 910 may have 1000 bytes of user data 913. The original data packet may have a 20-byte IP header 911 and a 20-byte TCP header 912. Thus, the original data packet may be 1040 bytes.

During the first layer of compression (e.g., inner layer compression), the SecureX module may compress the 1040 bytes original data packet 910 into an inner layer compressed data packet of 1010 bytes 923. In addition, the SecureX module may encrypt the inner layer compressed data packet. In other words, the 1010 bytes data 923 may be in encrypted version. The SecureX module may add a new inner layer IP header 921, an inner layer ESP header 922, and an inner layer integrity check value (ICV) 924 to the encrypted data 923 to generate a first layer (e.g., inner layer) compressed and encrypted data packet 920. The encrypted data 923 may be the payload of the first layer compressed encrypted data packet 920. The new inner layer IP header 921 may be 20 bytes, the inner layer ESP header 922 may be 8 bytes, and the ICV 924 may be 8 bytes. Thus, the first layer compressed encrypted data packet 920 may be 1046 bytes.

During the second layer of compression (e.g., outer layer compression), the SecureX module may compress the 1046 bytes first layer compressed and encrypted data packet 920 into an outer layer compressed data packet of 1018 bytes 933. In addition, the SecureX module may encrypt the outer layer compressed data packet. In other words, the 1018 bytes data 933 may be in encrypted version. The SecureX module may add a new outer layer IP header 931, an outer layer ESP header 932, and an outer layer integrity check value (ICV) 934 to the encrypted data 933 to generate a second layer (e.g., outer layer) compressed and encrypted data packet 930. The new outer layer IP header 931 may be 20 bytes, the outer layer ESP header 932 may be 8 bytes, and the ICV 934 may be 8 bytes. Thus, the second layer compressed encrypted data packet 930 may be 1054 bytes.

The overhead of the SecureX encryption scheme with compression for a UDP TCP packet with 1000 bytes of user data is 48 header bytes for a series of UDP frames, or 54 header bytes for a series of TCP fames, excluding the first frame, which may establish a flow ID used to eliminate the values of IP, UDP, TCP, and inner IPSEC fields that may be easily reconstructed at the receiver. For an original frame with 1000 bytes of user data, SecureX module may reduce the overhead to 4.8% for UDP or 5.4% for TCP. The header compression (or truncation, given that data is mostly eliminated, not encoded) may remove fields that are constant over the flow, such as IP address and UDP/TCP ports, as well as redundant fields like data length and checksums fields which may be derived from IPSEC fields. For comparison, an accounting of the most efficient two-layer IPSEC ESP tunnel based encryption may indicate 132 bytes for UDP or 144 bytes for TCP headers without compression. In both cases, the overhead in bytes may remain roughly constant independent of the amount of user data. The real overhead may be a function of the number of packet sent.

FIGS. 8-9 describe the header compression used to allow NSA approved public encryption algorithms, specifically, AES-GCM, to efficient double encrypt data using different encryption keys to secure data compliant with CSfC MA CP requirements. The SecureX module may follow an encryption order similar to employing two IPSEC tunnel mode VPNs, but at each encryption step, redundant fields in the IP, IPSEC, and UDP or TCP headers are eliminated to reduce the amount of overhead in the final result. The SecureX module may employ a flow tracking state machine, similar to flow tracking in a firewall, to record initial header field values and recreate header fields not transmitted for subsequent packets in the flow, so that at each decryption stage, the SecureX module may recreate a valid, routable packet identical to what was encrypted and compressed.

The SecureX encryption and header compression design may produce an IPSEC frame that can be routed like any other IPSEC frame. The field-packing applied to the outer IPSEC frame header and compression/truncation of header fields in the encrypted payload may make decryption by existing CSfC compliant VPN Client and VPN Gateway software impossible. A SecureX product may provide uncompressed IPSEC compliant encryption for interoperation with other vendor products.

Standard IPSEC encryption for 1000 bytes of user data sent via UDP may have overhead of anywhere between 78 and 85 bytes for a single layer of encryption, depending on algorithms used and padding required. 1000 bytes of TCP transmitted user data may require 90 to 97 bytes of overhead for a single encryption layer. Double encryption of 1000 bytes of data, as required by CSfC, may generate a UDP overhead of 12.8% to 14.2% and a TCP overhead of 14% to 15.4%.

SecureX header compression may reduce the header overhead of a doubly encrypted UDP frame to 48 bytes and for TCP to between 54 and 59 bytes, equivalent to 4.8% overhead for 1000 bytes of UDP transmitted user data or 5.4% to 5.9% overhead for 1000 bytes of TCP transmitted user data.

The SecureX compression algorithm may have two states. In the first state, the first data packet in a new packet flow (e.g., UDP or TCP flow) may be transmitted with uncompressed headers providing initial values for all IP and UDP or TCP headers fields. This may establish a packet flow and the values of fields that may be constant through any ongoing communications associated with the packet flow. Fields that are immutable for a UDP or TCP flow, or unchanging for each header in a packet flow for the life of the packet flow, may be recorded by two different SecureX compression agents (e.g., inner layer compression and outer layer compression), one for each of the two layers of decryption in the receiving SecureX VPN client or SecureX VPN gateway software. In the second state, the SecureX module of the receiving computing device (e.g., SecureX appliance) may recall and update the compressed value as needed (e.g., TCP sequence numbers). Specifically, the SecureX module in the receiving device may use the recorded values to recreate the complete headers as the data packet passes from the Outer VPN to the Inner VPN to the final destination, fully decrypted and reconstructed.

For the IP header, immutable fields are TTL (1 byte), protocol (1 byte) and original IP source and destination addresses (8 bytes). A TCP frame has immutable and predictable fields whose values can be re-derived as each packet is decrypted. The immutable TCP fields are the ports (4 bytes), while the predictable fields are the sequence (SEQ) and acknowledgement (ACK) numbers (4 bytes each), flags (1 byte) and window size (1 byte). The UDP frame immutable fields are the ports (4 bytes).

After the first packet, upon decryption, the SecureX may correlate the subsequent packets to the first packet in a flow using a flow ID. The sending SecureX module may assign a flow ID and transmit or pack the flow ID into the Identification and Fragment Offset fields of the IP header in the first and subsequent packets in the flow. The SecureX compression agent at the receiving computing device may record the full header information for a new flow, and use the full header information to update the header information record for subsequent packets in the flow. Because the SecureX module may pack the flow ID into existing, rarely used IP header fields, the flow ID does not contribute to the overhead of SecureX double layer encryption.

FIG. 10 illustrates encryption and compression overhead comparison 1000, according to an exemplary embodiment. The table of FIG. 10 may compare the header bytes included in double-encrypted frames using standard IPSEC ESP tunnel mode against the first and subsequent frames in a flow using SecureX encryption. The first packet may be uncompressed with overhead shown in column 1006; the subsequent packets may be compressed with overhead shown in column 1008. The first column of numbers 1002 may tally the headers in an uncompressed TCP/UDP packet for comparison. Each line of a column may account for a single header or encryption-related field expected to be present; empty entries may indicate the header or field is not expected to be present, while 0 may indicate the header or field has been compressed but can be reconstructed during decompression. Total overhead in UDP and TCP frames may be summed up in the final two rows 1010, 1012.

As indicated by the first row of FIG. 10, in all schemes any data traversing a network may need an IP header of 20 bytes. The two main forms of transport may be TCP and UDP. The TCP may have a larger header than UDP, providing reliable transmission through acknowledgement and allowing packets received out of order to be reordered at the receiver and reassembled in the order expected. Overhead for UDP may be less than TCP, as no handshaking or establishing of the connection is required.

The ESP tunnel-in-tunnel column 1004 may be calculated for standard IPSEC encryption with an AES-GCM encryption algorithm similar to that used by SecureX. Some AES-GCM implementations may use a 12 byte Integrity Check Value (ICV); others may use 16 bytes, hence two values are given in the ICV rows in the table of FIG. 10; SecureX may use a fixed ICV of 8 bytes. Depending on the size of the packets, IPSEC tunnel mode padding may be required to align the encrypted payload to a 4 byte boundary, requiring 0 to 3 bytes of padding. SecureX may not pad the payload.

A major limitation of existing VPN gateway and VPN client products on the current CSfC list may be that the existing VPN gateway and VPN client products do not provide quality of service (QoS) support. Since encrypted packets are indistinguishable in the existing methods, there may be no way of preferentially dropping lower priority packet flows when congestion happens. A network encountering congestion may benefit from prioritizing traffic so critical data is delivered in a timely manner and less critical data is delayed or dropped.

SecureX VPN components may support QoS management by supporting differentiated services code point (DSCP) bypass, preserving DSCP bits in the original plaintext IP packet by copying the relevant IP header field into the encapsulating inner and outer IPSEC headers. The DSCP bits may abstractly identify the type of traffic in the encrypted payload. As a result, the routing priority decision in the radio network may account for different traffic needs (e.g., low latency or high priority) without decrypting the traffic. All NSA-accredited inline network encryptors (INEs) may support such DSCP bypass based on the HAIPE standard. Furthermore, DSCP bypass may be part of the IPSEC standard. Hence, no deviation from MA CP or MSC CP requirements may be required to support this feature.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    removing, by a computing device executing a security software module, a portion of a header from a data packet, thereby generating an inner-layer compressed data packet;
    encrypting, by the computing device, the inner-layer compressed data packet using an inner-layer key;
    removing, by the computing device, a portion of a header from the inner-layer compressed data packet, thereby generating an outer-layer compressed data packet;
    encrypting, by the computing device, the outer-layer compressed data packet using an outer-layer key; and
    transmitting, by the computing device, the outer-layer compressed data packet to a secure network via an untrusted network.

2. The method according to claim 1, further comprising receiving, by the computing device, a plurality of data packets from a software application, wherein the plurality of data packets includes the data packet.

3. The method according to claim 2, wherein the computing device receives the plurality of packets as at least one of: a sequence of data packets, and a batch comprising all packets for a connection.

4. The method according to claim 2, further comprising transmitting, by the computing device, a first data packet of the plurality of data packets with uncompressed headers.

5. The method according to claim 2, further comprising associating, by the computing device, a flow identifier to each data packet of the plurality of data packets.

6. The method according to claim 2, wherein removing the portion of the header of the data packet comprises:
    removing, by the computing device, redundant header fields from one or more data packets of the plurality of data packets.

7. The method according to claim 1, further comprising:
    copying, by the computing device, one or more header fields of the data packet into at least one of: the header of the inner layer, and the header of the outer layer of the data packet.

8. The method according to claim 1, wherein the computing device encrypts the inner-layer compressed data packet using the inner-layer key according to a first encryption algorithm, and encrypts the outer-layer compressed data packet using the outer-layer key according to a second encryption algorithm.

9. The method according to claim 1, wherein the computing device is at least one of: an end-user device, and a gateway appliance.

10. The method according to claim 1, wherein the computing device receives the data packet from at least one of: an end-user device, and a gateway appliance.

11. A system comprising:
a non-transitory storage medium storing a plurality of computer program instructions including a security software module; and
a processor configured to execute the plurality of computer program instructions to:
remove a portion of a header from a data packet, thereby generating an inner-layer compressed data packet;
encrypt the inner-layer compressed data packet using an inner-layer key;
remove a portion of a header from the inner-layer compressed data packet, thereby generating an outer-layer compressed data packet;
encrypt the outer-layer compressed data packet using an outer-layer key; and
transmit via one or more untrusted networks the outer-layer compressed data packet to a secure network.

12. The system according to claim 11, wherein the processor is further configured to execute the plurality of computer program instructions to:
receive a plurality of data packets from a software application, wherein the plurality of data packets includes the data packet.

13. The system according to claim 12, wherein the processor receives the plurality of packets as at least one of: a sequence of data packets, and a batch comprising all packets for a connection.

14. The system according to claim 12, wherein the processor is further configured to execute the plurality of computer program instructions to:
transmit a first data packet of the plurality of data packets with uncompressed headers.

15. The system according to claim 12, wherein the processor is further configured to execute the plurality of computer program instructions to:
associate a flow identifier to each data packet of the plurality of data packets.

16. The system according to claim 12, wherein, when removing the portion of the header of the data packet, the processor is configured to remove one or more redundant header fields from one or more data packets of the plurality of data packets.

17. The system according to claim 11, wherein the processor is further configured to execute the plurality of computer program instructions to:
copy one or more header fields of the data packet into at least one of: the header of the inner layer, and the header of the outer layer of the data packet.

18. The system according to claim 11, wherein the processor encrypts the inner-layer compressed data packet using the inner-layer key according to a first encryption algorithm, and encrypts the outer-layer compressed data packet using the outer-layer key according to a second encryption algorithm.

19. The system according to claim 11, wherein the processor receives the data packet from at least one of: an end-user device, and a gateway appliance.

20. The system according to claim 11, wherein the processor is a component of at least one of: an end-user device, and a gateway appliance.

* * * * *